United States Patent
Bhowmik et al.

(10) Patent No.: US 6,980,355 B2
(45) Date of Patent: Dec. 27, 2005

(54) WAVELENGTH-TUNABLE AMPLIFIED OPTICAL SPLITTER

(75) Inventors: Achintya K. Bhowmik, San Jose, CA (US); Dmitri E. Nikonov, San Jose, CA (US); Shida Tan, San Jose, CA (US); John Sweetser, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 317 days.

(21) Appl. No.: 10/376,960

(22) Filed: Feb. 28, 2003

(65) Prior Publication Data

US 2004/0212876 A1    Oct. 28, 2004

(51) Int. Cl.$^7$ .................................. H04S 10/12
(52) U.S. Cl. ................... 359/337.21; 385/45
(58) Field of Search .................. 359/337.21, 337.22; 385/45

(56) References Cited

U.S. PATENT DOCUMENTS

| | | | |
|---|---|---|---|
| 4,846,540 A * | 7/1989 | Kapon | 385/45 |
| 5,233,453 A * | 8/1993 | Sivarajan et al. | 398/55 |
| 5,303,078 A * | 4/1994 | Brackett et al. | 398/51 |
| 5,396,328 A * | 3/1995 | Jestel et al. | 356/482 |
| 5,541,766 A * | 7/1996 | Mizrahi et al. | 359/337 |
| 5,598,294 A * | 1/1997 | Uno et al. | 359/337.21 |
| 5,608,571 A * | 3/1997 | Epworth et al. | 359/337.21 |
| 5,673,129 A * | 9/1997 | Mizrahi | 398/95 |
| 5,815,299 A * | 9/1998 | Bayart et al. | 398/94 |
| 6,160,658 A * | 12/2000 | Ishikawa | 359/337 |
| 6,201,637 B1 * | 3/2001 | Nilsson et al. | 359/341.33 |
| 6,249,365 B1 * | 6/2001 | Mizrahi et al. | 398/9 |
| 6,529,316 B1 * | 3/2003 | Treyz et al. | 359/337.11 |
| 2001/0050803 A1 * | 12/2001 | Choi et al. | 359/341.1 |
| 2002/0041432 A1 * | 4/2002 | Onaka et al. | 359/337.1 |

* cited by examiner

*Primary Examiner*—Jack Keith
*Assistant Examiner*—Eric Bolda
(74) *Attorney, Agent, or Firm*—Trop, Pruner & Hu, P.C.

(57) ABSTRACT

A signal may be split by a splitter into a plurality of output signals. Each of these output signals may then be amplified. Amplified spontaneous emission noise may be removed using a tunable filter for each of the signal outputs. As a result, an output signal may be provided with greater power so that, in some embodiments, a single split signal may be utilized to service more end users.

15 Claims, 3 Drawing Sheets

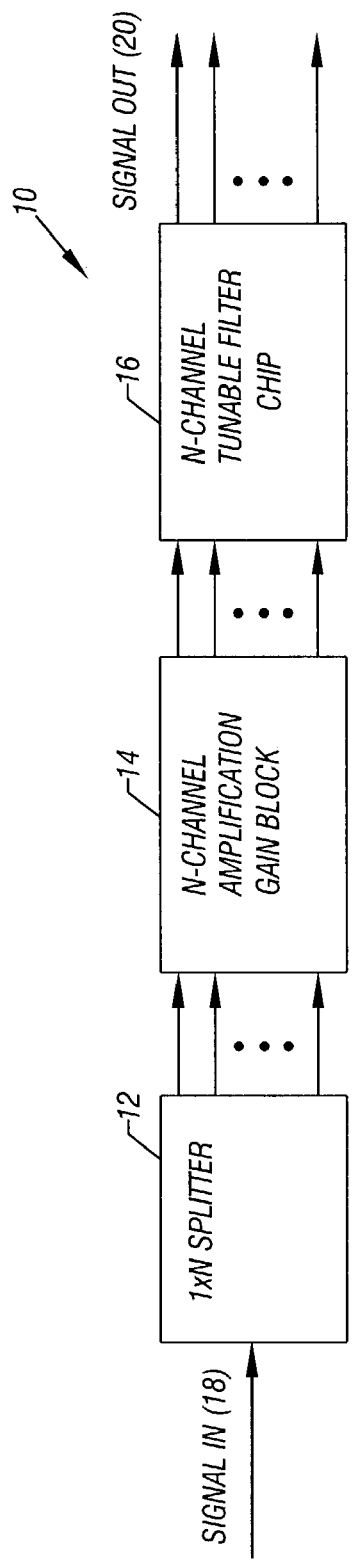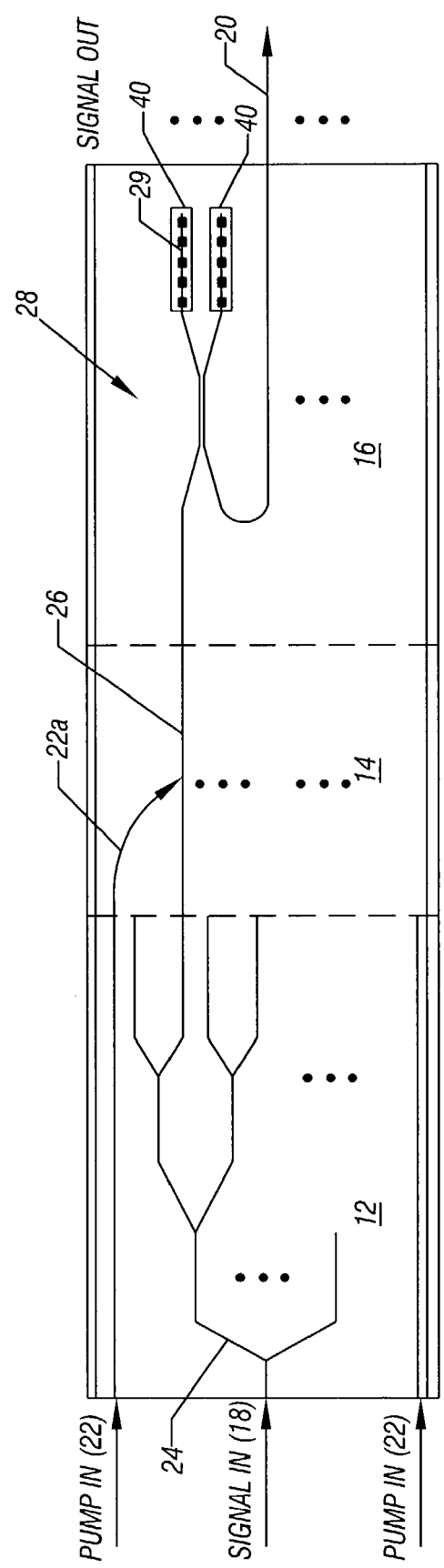

WAVELENGTH-TUNABLE AMPLIFIED OPTICAL SPLITTER

BACKGROUND

This invention relates generally to optical networks and, particularly, optical networks that use optical power splitters.

In an optical network, a signal may be transmitted over an optical fiber. The signal may include a plurality of channels, each of a different wavelength. In order to multiplex the different channels onto the fiber, a multiplexer may be used. A demultiplexer is used to separate the multiplexed channels at a destination.

A power splitter may divide a channel into a plurality of distinct outputs. A signal, containing a single channel or multiple channels, may be divided by a splitter and delivered to several different destinations.

Amplification is required to compensate for propagation losses and loss of power of the signals due to splitting. The amplification of the optical signal is usually provided by erbium-doped fiber amplifiers.

Currently, there is particular demand for optical splitter devices for use in fiber-to-the-curb (FTTC) and fiber-to-the-home (FTTH) communication networks. These splitter devices facilitate the distribution of a common signal to multiple customers. However, a conventional splitter severely limits the transmission link length and the number of customers due to the natural signal loss associated with every splitting function.

Erbium-doped amplifiers can be used to compensate for such losses, significantly increasing the number of customers that receive the same signal. However, erbium-doped amplifiers are too expensive for this low-cost application. Also the broadband amplified spontaneous emission (ASE) noise generated in the amplifier degrades the signal-to-noise ratio, posing a limit on the number of customers serviced by the split signal.

Thus, there is a need for better ways to provide amplified splitting in optical networks.

BRIEF DESCRIPTION OF THE DRAWINGS

FIG. 1 is a schematic depiction of one embodiment of the present invention;

FIG. 2 is a more detailed depiction of the embodiment shown in FIG. 1 in accordance with one embodiment of the present invention;

DETAILED DESCRIPTION

Figure 3:
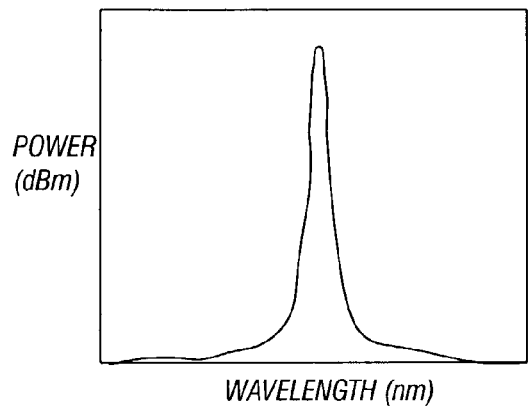
FIG. 3 shows a hypothetical input to the splitter 12 shown in FIG. 1, in accordance with one embodiment of the present invention.
Figure 4:
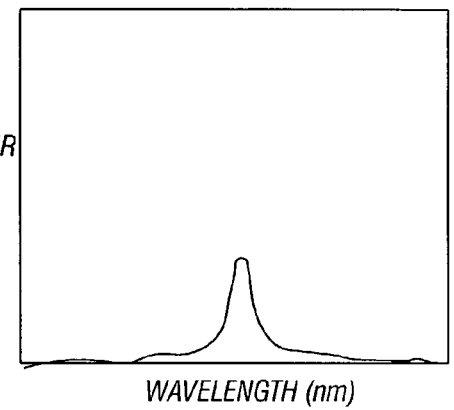
FIG. 4 shows a hypothetical output from the splitter 12 in accordance with one embodiment of the present invention.

Referring to FIG. 1, a 1×N splitter 12 receives an input signal 18 which may be an optical multiplexed signal. The splitter 12 splits the input signal 18 into N output signals. For example, an input signal, as shown in FIG. 3, may be split to produce a plurality of output signals of the type shown in FIG. 4. Each split signal, as shown in FIG. 4, has the same peak wavelength as the input signal 18, but the amplitude of that peak may be substantially diminished compared to the amplitude of the input signal 18.

A variety of splitters 12 may be utilized, including a cascaded Y-junction splitter and a multi-mode interference splitter.

Figure 5:
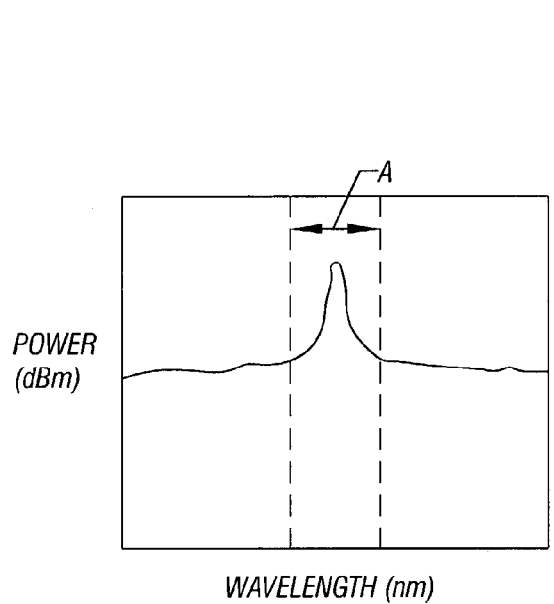
FIG. 5 shows a hypothetical output from the amplification gain block 14 in FIG. 1 in accordance with one embodiment of the present invention.

The split output signals from the splitter 12 are then amplified by the N-channel amplification gain block 14. The amplification gain block 14 may use pump lasers and erbium-doped waveguides in one embodiment. The output from the gain block 14 in one hypothetical example is shown in FIG. 5. While the peak power is now higher, a noise floor has been created as a result of amplified spontaneous emission (ASE) from the amplifier.

The split signals from the gain block 14 may then be subjected to an N-channel, tunable filter 16 in accordance with one embodiment of the present invention. The filter 16 removes the noise floor resulting in the hypothetical output signal shown in FIG. 6. The filter 16 may, for example, be a thermo-optically tuned waveguide Bragg grating pair that is written using ultraviolet light on an integrated Michelson interferometer. In such case each of the Bragg gratings 29 is heated to a certain temperature to tune the reflected band of resonant wavelengths to correspond to the wavelength of the peak amplitude.

As another example, the reflected light from a single reflective Bragg grating can be separated from incident light using an optical circulator (not shown). The circulator passes the input light and outputs the light reflected by the tunable Bragg grating. As still another example, a single transmissive tunable Bragg grating may be used to pass the desired band of resonant wavelengths corresponding to the peak amplitude.

The structure shown in FIG. 1 may be made using a monolithic integration approach with all three functional blocks, 12, 14, and 16 fabricated on a single planar waveguide optical chip. Alternatively, in the hybrid approach, functional blocks may be fabricated in separate chips and then directly attached in a multi-chip module format. In still another alternative, a fiber integration approach may be used in which the functional blocks are fabricated and packaged separately and then interconnected by way of optical fibers.

In some embodiments, the use of the tunable filter 16 may significantly increase the number of end points or customers accessible by a common network node. This may mitigate one of the most severe bottlenecks in FTTC/FTTH communication systems, namely, the restriction of the link length and the number of customers for a common signal due to losses associated with splitting. Furthermore, in some embodiments, the user may have less ASE noise, thereby improving the bit-error rate of the transmission system.

Referring to FIG. 2, an embodiment is illustrated in which the splitter 12 is implemented by a series of 1×2 Y-junction splitters 24. An input pump 22 may be provided to each split signal from the splitter 12 as indicated at 22a. The amplified signal line 26 exits the N-channel amplification gain block 14 and may go to a Michelson interferometer 28 in one embodiment. One of the arms of the interferometer 28 may provide the output signal 20.

Figure 6:
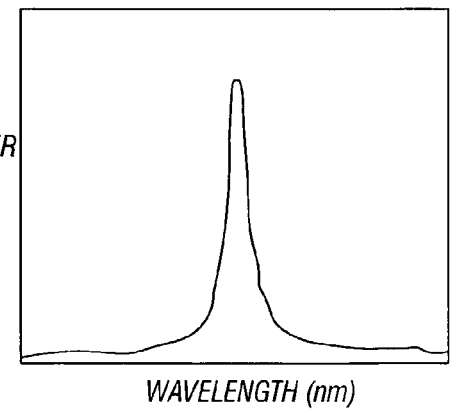
FIG. 6 shows a hypothetical output from the tunable filter chip 16 shown in FIG. 1 in accordance with one embodiment of the present invention.

A thermally heated Bragg grating 29 may be provided in each of two arms of the Michelson interferometer 28. These Bragg gratings 29 act as an optical filter to select one or more desired bands of wavelengths to form the output 20. In one embodiment, the Bragg grating pairs 29 filter a desired band of resonant wavelengths by reflecting that band to become the output signal 20. If the wavelength of the reflected band is tuned by heating, using the heaters 40, to correspond to the peak amplitude (see the pass band A in FIG. 5), the noise floor (FIG. 5) may be removed (FIG. 6). In one embodiment, the heaters 40 may be micro-heaters that heat using electrical resistance.

Figure 7:
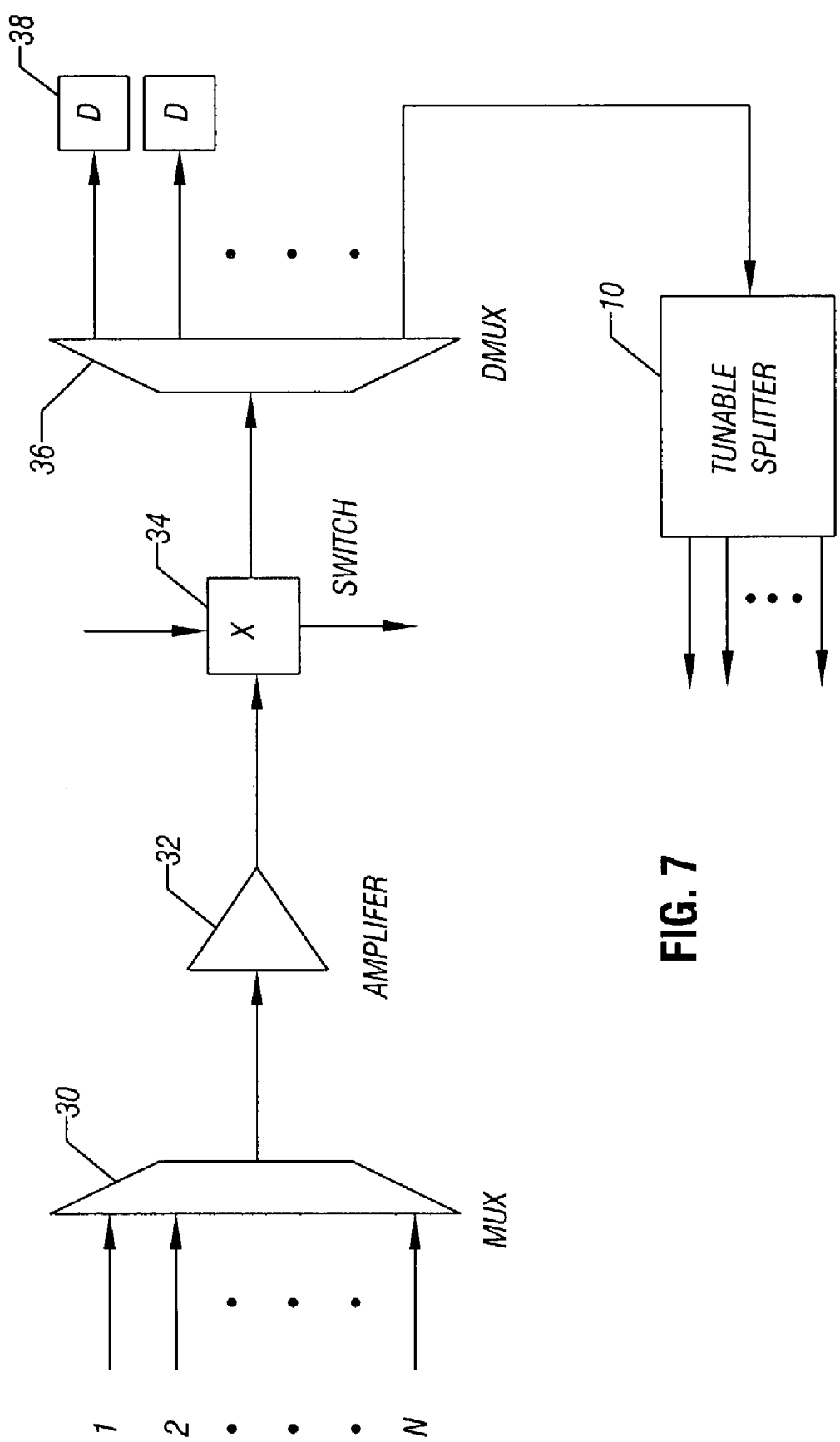
FIG. 7 is a system schematic depiction in accordance with one embodiment of the present invention.

Referring to FIG. 7, an optical system may include a multiplexer 30 that multiplexes a N number of channels 1 through N. Those signals may then be amplified by an amplifier 32 which may use erbium doping. A switch 34 may be used to switch different signals before demultiplexing at the demultiplexer 36. Each demultiplexer signal may go to a desired destination 38. Alternatively, the tunable splitter 10 may be utilized to further split the signal to increase the number of end users that can be serviced by the same demultiplexed output signal.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optical splitter comprising:
   a splitter section to create at least two output signals from a single input signal;
   an amplifier to amplify each of the at least two output signals from the splitter section; and
   a tunable filter configured to filter amplified spontaneous emission noise from each of said at least two output signals.

2. The splitter of claim 1 wherein said tunable filter includes a Bragg grating.

3. The splitter of claim 2 wherein said tunable filter includes a pair of Bragg gratings.

4. The splitter of claim 3 wherein the tunable filter includes a Michelson interferometer including a pair of reflective Bragg gratings.

5. The splitter of claim 1 including a reflective Bragg grating.

6. The splitter of claim 1 wherein said splitter section includes a Y-junction splitter.

7. The splitter of claim 1 wherein said tunable filter passes a band of wavelengths that includes the peak wavelength of the input signal.

8. The splitter of claim 1 including a tunable filter that is tunable through a thermo-optic effect.

9. The splitter of claim 8 wherein said tunable filter includes a Bragg grating with a heater.

10. An optical splitter comprising:
    a splitter section to create at least two output signals from a single input signal;
    an amplifier to amplify each of the at least two output signals from the splitter section; and
    a tunable filter including at least one Bragg grating configured to filter amplified spontaneous emission noise from each of said at least two output signals.

11. The splitter of claim 10 wherein said filter includes a Michelson interferometer including a pair of Bragg gratings.

12. The splitter of claim 10 including a heater to heat said Bragg grating to tune the pass band of the filter.

13. The splitter of claim 10 including a tuner to allow the pass band to be tuned.

14. The splitter of claim 10 wherein said Bragg grating passes wavelengths within the pass band.

15. The splitter of claim 10 wherein said splitter section includes a Y-junction splitter.

* * * * *